Feb. 29, 1972   R. R. PUTHET   3,646,093
PROCESS FOR THE CONTINUOUS HYDROLYSIS OF
DIORGANODICHLOROSILANES
Filed July 22, 1969
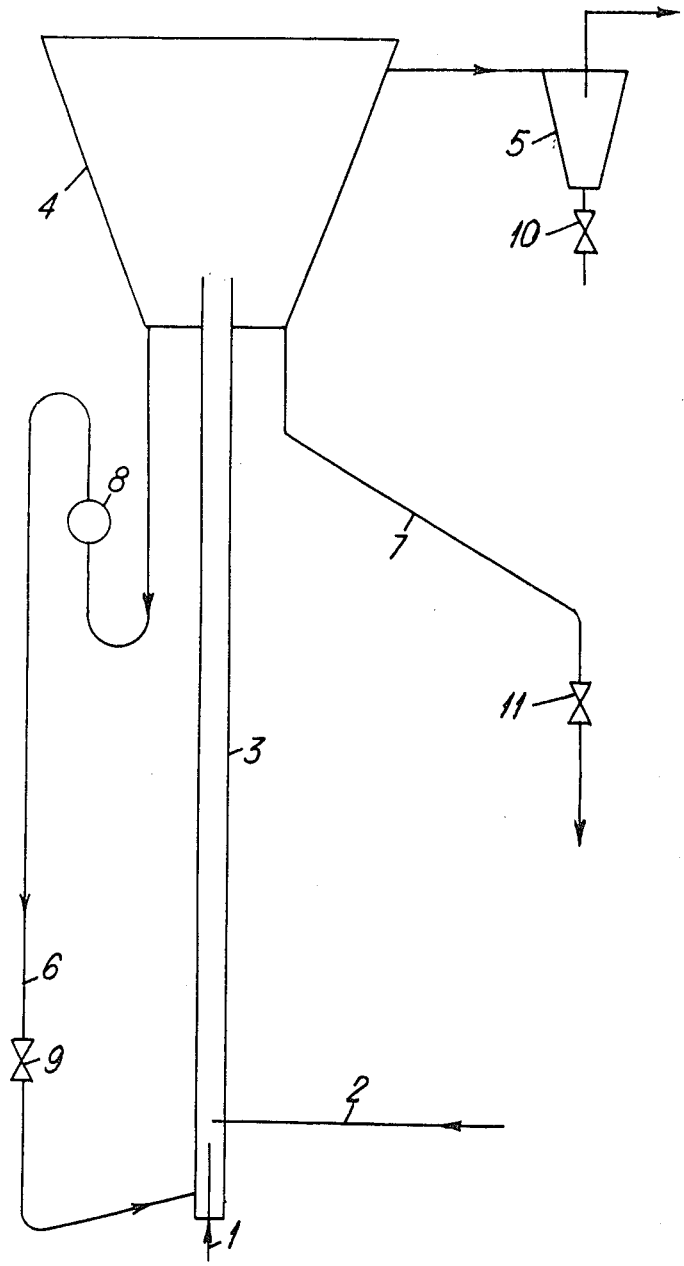
Inventor
Robert Raphael Puthet
By
Cushman, Darby & Cushman
Attorneys United States Patent Office 3,646,093
Patented Feb. 29, 1972

3,646,093
PROCESS FOR THE CONTINUOUS HYDROLYSIS OF DIORGANODICHLOROSILANES
Robert Raphael Puthet, deceased, late of Lyon, France, by Daniel Gras, legal representative, 22 Avenue Montaigne, Paris France
Filed July 22, 1969, Ser. No. 845,124
Claims priority, application France, July 24, 1968, 160,463
Int. Cl. C07f 7/02
U.S. Cl. 260—448.2 E                                 3 Claims

ABSTRACT OF THE DISCLOSURE

Diorganopolysiloxanes of low viscosity and hydrogen chloride substantially free of organochlorosilanes are made simultaneously and continuously by passing diorganodichlorosilane and a small excess of water vapour to the base of a column containing upwardly circulating diorganopolysiloxane. Hydrogen chloride and part of the diorganopolysiloxane are withdrawn at the top of the column and the remainder of the diorganopolysiloxane is recycled to the base of the column.

---

This invention relates to the continuous hydrolysis of liquid diorganodichlorosilanes to produce diorganopolysiloxanes of low viscosity and hydrogen chloride.

In the process of French Pat. No. 993,606 organochlorosilanes are hydrolysed with water vapour, the latter being introduced into the lower part of a contact zone and the organochlorosilanes being introduced into the upper part of this same zone. This process generally makes it possible to obtain organopolysiloxanes of low viscosity; but the process has the disadvantage that the hydrogen chloride gas collected is not free of starting organochlorosilanes, and it is very difficult to separate these from their mixtures with hydrogen chloride gas.

French Pat. No. 1,077,230 describes a process for the preparation of organopolysiloxanes of low viscosity by hydrolysis of organochlorosilanes in a device consisting of a loop circuit containing a centrifugal pump, a circulation pipeline of which a part passes through a cooling zone, an overflow inlet feeding a decantation separator and two separate inlets for the organochlorosilanes and for the hydrolysing liquid. This technique makes it possible to operate continuously but, after decantation of the organopolysiloxane layer, it yields aqueous solutions of hydrochloric acid which always contain small amounts of organopolysiloxanes. The presence of such polymers makes these solutions markedly hydrophobic and prevents them from being subsequently used as such for various applications such as for example descaling metal surfaces. Furthermore, the device used in this process employs a centrifugal pump which in addition to complicating the apparatus and giving rise to the danger of breakdowns during operation, also represents a not insignificant power consumption.

A new process for the continuous hydrolysis of diorganodichlorosilanes has now been found which makes it possible simultaneously to obtain diorganopolysiloxanes of low viscosity and hydrogen chloride gas free of starting organochlorosilanes, which comprises continuously and separately injecting into the lower part of a vertically elongated reaction zone, at substantially the same level, one or more diorganodichlorosilanes and water vapour at a rate corresponding to an excess of water over that theoretically required to hydrolyse the said dichlorosilane of from 0.1 to 8% by weight, passing the said reagents and their reaction products upwardly through the said zone, recycling the reaction products from the upper part to the lower part of the said zone at a rate such that the ratio of the volume of hydrogen chloride gas produced in a given time to the volume of reaction products recirculated in the same time is from 2.8:1 to 4:1, and withdrawing diorganopolysiloxanes of low viscosity from the upper part of the said zone, the temperature of the reagents and products being kept below 30° C. throughout.

The process of the invention can be easily carried out in an apparatus such as that shown in the accompanying drawing.

The water vapour is continuously introduced at the bottom of a column 3 by means of a tube 1 and the diorganodichlorosilane (or mixture of diorganodichlorosilanes) also continuously by means of a tube 2. Hydrogen chloride gas and diorganopolysiloxanes form instantly and mix intimately with other diorganopolysiloxanes previously obtained in a similar manner and being recycled, and the whole mixture rises in the column in the form of a fine emulsion. When the emulsion reaches the top of the column, the hydrogen chloride gas escapes and travels to a cyclone separator 5 in order, where necessary, to be freed of traces of diorganopolysiloxanes carried along in the form of froth. The diorganopolysiloxanes overflow into the widened-out chamber 4 which can have any desired shape such as cylindrical, spherical, ovoid or conical, and are then recycled through the circulation pipeline 6 and returned to the bottom of the column 3. At the same time diorganopolysiloxanes are continuously withdrawn from the bottom of the chamber 4 through the pipeline 7 and pass into a storage vessel not shown in the drawing. A device 8 for measuring the flow rate such as a rotameter, volumetric counter, or flowmeter with a pressure-reducing device, and an adjustable valve 9 for controlling the flow rate, are interposed in the circulation pipeline 6. A valve 10 is located at the bottom of the cyclone separator 5 to facilitate its emptying and a valve 11 located on the pipeline 7 allows the flow of the diorganopolysiloxanes to be regulated when the circulation system is in operation.

The process of the invention can be used for the hydrolysis of the most diverse diorganodichlorosilanes of formula: $R_1R_2SiCl_2$, in which $R_1$ and $R_2$, which may be identical or different, represent organic radicals, especially alkyl or alkenyl radicals of up to 4 carbon atoms such as methyl, ethyl, propyl, butyl, vinyl, or allyl.

In order to achieve as complete a reaction as possible as soon as the two reagents are brought together and before they are diluted by the diorganopolysiloxane formed, a slight excess of water of the order of 0.1 to 8% by weight relative to the theoretical amount required is used, that is to say one mol of water per 2 gram atoms of chlorine. A smaller amount does not allow the injected diorganodichlorosilanes to be correctly hydrolysed and a greater amount reduces the yield of hydrogen chloride gas and increases the viscosity of the diorganopolysiloxanes.

In the process of the invention the recycling of the diorganopolysiloxanes which are practically free of hydrogen chloride gas provides a very efficient means of stirring. As there is a very marked difference in density and viscosity between the emulsion rising in the column 3 and the diorganopolysiloxanes descending in the pipeline 6 the whole circulates at high speed and better contact of the reagents and vigorous washing of the hydrogen chloride gas by the reaction liquid result therefrom. However, in order to start the emulsion at the level of the injection nozzles and preserve this emulsion over the entire height of the column the ratio of hourly volume of hydrogen chloride gas formed/hourly circulation volume must be within a well defined range which is between 2.8:1 and 4:1. If the rate of circulation is too high relative to the rates of injection of the reagents, leading to a ratio below 2.8:1, it is found that the reagents are diluted as soon as they are injected and that there are non-emulsified zones in the column and that diorganopolysiloxanes still containing hydrogen chloride gas are recycled. Against this, if the rate of circulation is too low, resulting in a ratio greater than 4:1, the circulation is irregular and this irregularity reveals itself in sudden surges of the emulsion rising in the column. A temperature above 30° C. causes this same phenomenon of irregularity with disturbances occurring in the circuit, and large differences in temperature, exceeding 10° C., can be measured along the column 3 in the mixture which circulates in bursts.

It is frequently advantageous to cool the circulation pipeline 6 by placing a cooling system in its way so as to increase the difference in density between the liquid circulating in this pipeline and the emulsion rising in the column 3, thereby favouring a good recycling of the diorganopolysiloxanes.

The yields of diorganopolysiloxanes are practically quantitative if the losses due to handling are neglected. The polymers obtained have a low viscosity which can vary from 3 to 15 cst. at 25° C. depending on the nature of the starting diorganodichlorosilane, and this viscosity does not significantly change during storage. The polymers still contain a certain measure of acidity which can be expressed in the form of a hydrochloric acid content which can vary from 3 to 8% by weight, and which arises from small amounts of dissolved or absorbed hydrogen chloride gas and from some non-hydrolysed SiCl bonds. Simple treatment with dilute aqueous solutions of an alkaline reagent such as sodium carbonate or bicarbonate yields neutral diorganopolysiloxanes of viscosity ranging from 10 to 25 cst. at 25° C. which can be directly used in organosilicon chemistry for rearrangement with other organopolysiloxanes or for pyrolysis to yield cyclic compounds which are converted into very pure polymers of high molecular weight.

The yields for the hydrogen chloride gas collected are greater than 90%. This gas does not contain starting diorganodichlorosilanes, as is shown by analytical tests. Any traces of water and of diorganopolysiloxanes which it contains can be easily trapped by bubbling through concentrated sulphuric acid and passing over an active adsorbent such as charcoal or zeolite. The process can be carried out at ordinary pressure but preferably this treatment is carried out on gas which has beforehand been compressed to 2 or 3 bars.

The invention is illustrated by the following example.

EXAMPLE

The apparatus used is that represented in the accompanying drawing. A column 3 of 2050 mm. height and 40 mm. internal diameter is used, the top of which reaches 50 mm. into a chamber 4 in the shape of an inverted truncated cone of volume 10 dm.³. Further, one end of a circulation pipeline 6 of internal diameter 20 mm. is joined to the bottom of the chamber 4 and the other end is joined to the lower part of the column 3. A rotameter 8 which measures flow rates up to 1 m.³/hour and a regulating valve 9 for regulating these flow rates are interposed in this pipeline. A flow tube 7 of internal diameter 20 mm. on which a shut-off valve 11 is located is also attached to the bottom of the chamber 4, and a "cyclone" separator 5 of volume 0.3 dm.³ is interposed in the outlet pipeline for the hydrogen chloride gas leaving the chamber 4. The reagents enter the bottom of the column through two cylindrical injection nozzles 1 and 2 of diameter 3 mm.

Dimethyldichlorosilane is injected through the nozzle 2 at the rate of 50 mols/hour and water vapour originating from the hourly vapourisation of 915 cm.³ of water is injected through the nozzle 1. After 1 hour 15 minutes feed, the hydrolysis circuit is full and the circulation starts; the circulation flow rate is then adjusted by means of the valve 9 to 700–800 l./hour so as to form the emulsion in the column 3 at the level of the nozzles 1 and 2.

When the circulation system is operating, the process is carried out continuously, continuing to introduce the reagents at the above-mentioned rates whilst removing, through the tube 7, 3.7–4 l./hour of methylpolysiloxanes through opening the valve 11. The temperature in the column remains at about 22–25° C. throughout the operation, which lasts about 20 hours.

The hydrolysis contact time, calculated from the ratio of volume of siloxanes in circulation/volume of siloxanes formed hourly, is about 1 hour 20 minutes and the circuit contains about 5 l. of dimethylpolysiloxanes. The ratio of hourly volume of hydrogen chloride gas formed/hourly circulation volume measured on the column 6 is about 3.1:1 to 3.5:1 throughout the duration of the operation.

The dimethylpolysiloxanes withdrawn have a viscosity which varies from 5 to 8 cst. at 25° C. and which for practical purposes does not change on storage. The acidity of these dimethylpolysiloxanes, expressed in percent by weight of hydrochloric acid, is between 6 and 7%. Neutralisation with a 5% sodium carbonate solution, using 5 volumes of solution per 1 volume of dimethylpolysiloxanes, yields neutral dimethylpolysiloxanes of average viscosity 15.8 cst. at 25° C., the yield of which, calculated relative to the dimethyldichlorosilane employed, is practically quantitative. The hydrogen chloride gas, the yield of which, calculated in an identical manner, exceeds 90%, does not contain dimethyldichlorosilane and only contains some traces of water and of dimethylpolysiloxanes which are easily removed by bubbling through concentrated sulphuric acid.

I claim:

1. Process for the continuous and simultaneous production of a diorganopolysiloxane of viscosity between 3 and 15 centistokes at 25° C. and gaseous hydrogen chloride substantially free from diorgano dichlorosilane reactant which comprises continuously and separately injecting into the lower part of a vertically elongated reaction zone, and substantially at the same level, at least one diorganodichlorosilane of the formula $R_1R_2SiCl_2$ where $R_1$ and $R_2$ are each alkyl or alkenyl of up to 4 carbon atoms and water vapor at a rate corresponding to an excess of water over that theoretically required to hydrolyze the said dichlorosilane of from 0.1 to 8% by weight, passing the said reagents and their reaction products upwardly through the said zone, recycling the reaction products from the upper part to the lower part of the said zone at a rate such that the ratio of the volume of hydrogen chloride gas produced in a given time to the volume of reaction products recirculated in the same time is from 2.8:1 to 4:1, and withdrawing a diorganopolysiloxane of viscosity between 3 and 15 centistokes at 25° C. from the upper part of the said zone, the temperature of the reagents and products being kept below 30° C. throughout.

2. Process according to claim 1 in which $R_1$ and $R_2$ are both methyl.

3. Process according to claim 1 in which the reaction products from the upper part of the said zone are cooled before being recycled to the lower part of the said zone.

References Cited

UNITED STATES PATENTS 3,493,595   2/1970   Strasser et al. _____ 260—448.2

JAMES E. POER, Primary Examiner
W. F. W. BELLAMY, Assistant Examiner

UNITED STATES PATENT OFFICE
CERTIFICATE OF CORRECTION

Patent No. 3,646,093   Dated February 29, 1972

Inventor(s) Robert Raphael Puthet

It is certified that error appears in the above-identified patent and that said Letters Patent are hereby corrected as shown below:

Line 3 of the patent heading, third line below the title, should read as follows:

"Montaigne, Paris, France, assognor to Rhone-Poulenc S.A., Paris France"

Signed and sealed this 14th day of January 1975.

(SEAL)
Attest:

McCOY M. GIBSON JR.
Attesting Officer

C. MARSHALL DANN
Commissioner of Patents